US007764812B2

(12) United States Patent
McQuaide, Jr.

(10) Patent No.: US 7,764,812 B2
(45) Date of Patent: Jul. 27, 2010

(54) APPARATUS, METHODS AND COMPUTER PROGRAM PRODUCTS FOR BIOMETRIC CONFIRMATION OF LOCATION-BASED TRACKING

(75) Inventor: Arnold Chester McQuaide, Jr., Berkeley Lake, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 944 days.

(21) Appl. No.: 11/551,825

(22) Filed: Oct. 23, 2006

(65) Prior Publication Data

US 2008/0095409 A1 Apr. 24, 2008

(51) Int. Cl.
*G06K 9/00* (2006.01)

(52) U.S. Cl. .................................. 382/124; 340/539.13

(58) Field of Classification Search ............ 340/539.13; 382/115–127

See application file for complete search history.

(56) References Cited

U.S. PATENT DOCUMENTS

2006/0149971 A1* 7/2006 Kozlay ........................ 713/186
2007/0159343 A1* 7/2007 Crucilla ................... 340/573.4
2009/0231436 A1* 9/2009 Faltesek et al. ............. 348/169

* cited by examiner

*Primary Examiner*—Brian P Werner
(74) *Attorney, Agent, or Firm*—Myers Bigel Sibley & Sajovec

(57) ABSTRACT

Embodiments of the present invention provide apparatus, methods and/or systems for providing location based tracking with biometric confirmation. Some embodiments can include, a location identifier configured to determine the geographical location of the device and a biometric identifier configured to determine an identity of a proximate person who is proximate the device and generate an identity validation value corresponding to the identity.

20 Claims, 6 Drawing Sheets

380

| DEVICE TYPE (382) | BIOMETRIC INPUT (384) | PRIMARY FUNCTION (386) |
|---|---|---|
| WATCH | RETINAL SCAN | WATCH FACE |
| WATCH | FINGERPRINT | WATCH CRYSTAL |
| TELEPHONE | VOICE PRINT | AUDIO RECEIVER |
| PDA | FINGERPRINT | DISPLAY SCREEN |
| DOG TAG | FINGERPRINT | N/A |
| DOG TAG | BIOLOGICAL PROCESS | N/A |
| MUSIC PLAYER | FINGERPRINT | CONTROL PAD |
| RELIGIOUS SYMBOL | BIOLOGICAL PROCESS | N/A |
| CAMERA | RETINAL SCAN | EYEPIECE |

FIG. 6

390

| REPORT FORMAT | | |
|---|---|---|
| LOCATION (392) | VALIDATION VALUE (394) | TIMESTAMP (396) |

FIG. 7

APPARATUS, METHODS AND COMPUTER PROGRAM PRODUCTS FOR BIOMETRIC CONFIRMATION OF LOCATION-BASED TRACKING

FIELD OF THE INVENTION

This invention relates to portable electronic apparatus, systems, and methods, and, more particularly, to apparatus, systems, and methods for location identification.

BACKGROUND OF THE INVENTION

Location detection of third parties can be a valuable tool in a variety of circumstances. For example, it may be extremely valuable for parents to be able to locate their children. Similarly, location detection can be valuable in protecting persons having limited and/or reduced capacity, such as elderly and/or disabled people. Other contexts where location detection can be valuable can include military and/or law enforcement applications where knowing the specific location of an individual can be beneficial.

The evolution of location detection capable devices such as cellular telephones, global positioning system (GPS) receivers, and radio frequency identification (RFID) devices has improved the capacity to perform location-based tracking of an individual. Such devices, however, may be limited in that they can provide the location of the device and provide no information as to the identity of the person, if any, with the device. Some approaches for overcoming this shortcoming can include requiring a user to use a code key to verify his identity. In the case of a physical code key, such as a device having an encrypted identification code, the issue of whether or not the user is with the device can be unresolved. Other approaches can use a response code that can be entered by a user to verify his identity. The response code, however, can be compromised, surreptitiously, and/or coercively, and be used by a non-user. Additionally, some location tracking devices can be contained within small, concealable devices such as a wristwatch or identification tag and thus do not otherwise provide an interface for code entry. For example, a small, concealable device may not include a display and/or keypad that may be necessary for entering such a code.

SUMMARY OF THE INVENTION

Embodiments of the present invention provide apparatus, method and/or systems for biometric confirmation of location-based tracking. Embodiments of such methods can include storing, in a setup operation of a remote device, biometric data of a user and locating the remote device using a wireless communication technique. Methods can further include receiving, into the remote device, biometric data corresponding to a proximate person and confirming an identity of the proximate person by comparing the received biometric data with the stored biometric data. In embodiments of such methods the identity of the user may be validated based on the results of the comparison.

In some embodiments, methods can include generating a confirmation report corresponding to results of the comparing and transmitting the confirmation report to a recipient. In some embodiments, a confirmation report can include a validation value that is correspondent to whether the proximate individual is the user, a location of the remote device, and a time stamp, that can identify the time and date that the biometric data is received.

In some embodiments, the received biometric data can be transmitted from the remote device to an external device, the reference biometric data can be stored in the external device, and the received biometric data can be compared with the stored biometric data to confirm the identity of the proximate person in the external device.

In further embodiments, a validation value, a validation location, and a validation time can be logged in the remote device.

In yet further embodiments, receiving biometric data can include prompting the user to provide the biometric data, initiating a countdown timer corresponding to a user response time to provide the biometric data, and generating a confirmation report based on a previously logged validation responsive to the countdown timer.

In some embodiments, a query can be received by a recipient and the identity of the recipient can be verified. A confirmation report corresponding to a validation of the user identity can be generated and transmitted to the recipient.

In further embodiments, an alert report that includes the location of the remote device can be generated and transmitted to the recipient if the remote device traverses an approved geographical boundary.

Some embodiments can include systems for providing location based tracking with biometric confirmation. Embodiments of such systems can include a location module in a remote device configured to determine a location of the remote device and an identification module in the remote device configured to use biometric data to validate a user identification and proximity to the remote device at the location. Embodiments of such systems can also include a report module configured to generate a report corresponding to the location and the user identification and a communication module configured to receive query data from a recipient and to transmit the report to the recipient.

The identification module of some embodiments can include a storage module configured to store biometric profile data of at least one user, a detection module configured to receive biometric data from the at least one user, and an evaluation module configured to compare the received biometric data with the stored biometric profile data and generate a validation value that corresponds to a correlation between the received biometric data and the stored biometric data. In some embodiments, a detection module can include a prompt generator configured to provide the user with a prompt to provide biometric data and a biometric input device configured to collect the biometric data. A biometric input device of some embodiments can include a fingerprint scanner configured to receive image data corresponding to a fingerprint of the user.

In some embodiments the communication module can also transmit the report responsive to receipt of updated location and/or biometric data. In further embodiments, the communication module can transmit an alert report if the location of the remote device is not in am approved location zone and to transmit the alert report if the location of the remote device is in a restricted location zone.

Yet further embodiments can include a tracking module configured to store historical report data comprising location data, a validation value, and a timestamp.

Embodiments can also include a portable device for providing location based tracking with biometric confirmation. A portable device of some embodiments can include a location identifier in the portable device configured to determine a geographical location of the portable device and a biometric identifier in the portable device configured to determine an identity of a proximate person who is proximate to the portable device and to generate an identity validation value corresponding to the identity of the proximate person.

In some embodiments, such a device can include a location data transmitter configured to transmit the geographical location of the portable device and the identity validation value to a recipient. Some such embodiments can also include a receiver that can receive a query from the recipient, wherein the location data transmitter transmits responsive to the query.

In further embodiments, the biometric identifier can include a data storage device configured to store biometric profile data corresponding to the user, a biometric data detector that can collect proximate person biometric data, and an identity evaluator that can compare the biometric profile data with the collected proximate person biometric data to determine if the proximate person is the user.

In yet further embodiments, the biometric identifier can include a retinal scanner.

In some embodiments, the portable device can include a first function module configured to provide a function that is different from the location identifier and the biometric identifier and a non-identifier interface that is configured to receive input from the proximate person related to a first function, wherein a biometric detector is integrated into the non-identifier interface.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 6 is a table illustrating exemplary biometric input components for biometric confirmation in location-based tracking according to some embodiments of the present invention.

FIG. 7 is a table illustrating a report format for systems/methods/apparatus for biometric confirmation in location-based tracking according to some embodiments of the present invention.

DETAILED DESCRIPTION

Figure 1:
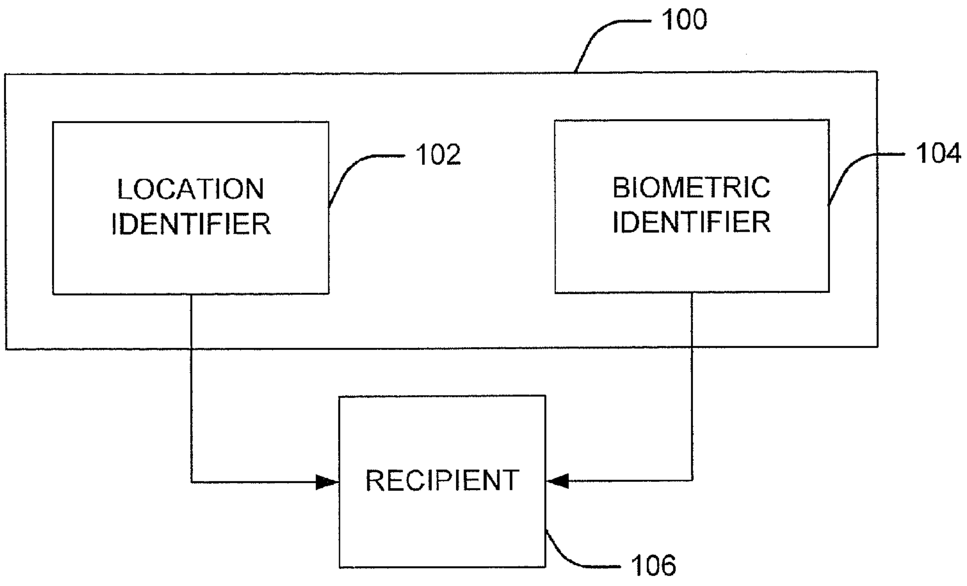
FIG. 1 is a block diagram illustrating functional components in systems/methods/apparatus for biometric confirmation in location-based tracking according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Some embodiments of the present invention may arise from a recognition that it may be desirable to use biometric data to confirm an identity of a user in location-based tracking. In particular, an evaluation of biometric data collected at a location with a biometric profile may be useful to confirm a user identity at that location. In embodiments of the present invention, a location identifier can be used to determine a geographical location of an apparatus and a biometric identifier can be used to determine an identity of a person proximate to the device. The identification can include generating an identity validation value corresponding to the identity of the proximate person.

Reference is made to FIG. 1, which is a block diagram illustrating functional components in systems/methods/apparatus for biometric confirmation in location-based tracking according to some embodiments of the present invention. For example, a device 100 that can provide location-based tracking with biometric confirmation can include a location identifier 102 that is configured to determine a geographical location of the device. In some embodiments, the location identifier 102 can include a receiver configured to receive signals from one or more sources, including, for example, satellites that transmit signals for a Global Positioning System (GPS). The location identifier 102 of some embodiments can include a passive device, such as a radio frequency identification (RFID) tag, that is configured to respond to an incoming radio frequency signal by powering up an integrated circuit and transmitting a response. The location of the RFID transmission can be determined, for example, using triangulation techniques.

The device 100 can also include a biometric identifier 104 configured to receive and analyze biometric data from a proximate user of the device 100. A biometric identifier 104 of some embodiments can be configured to receive biometric data in the form of a fingerprint, a retinal scan image, a voice print, and/or some other biological process related data that can be determined as unique to a user. The received biometric data can be analyzed by, for example, comparison to previously stored biometric data from the user. Based on the analysis of the received biometric data, an identity validation value can be generated corresponding to the identity of the proximate user. The identity validation value can be a single validation bit that confirms the identity of the proximate user, an identification code identifying which of a group of possible users is the proximate user, and/or a correlation value that includes statistical identification reliability information, among others.

In some embodiments, the biometric data can be received as a response to a prompt from the device 100. The biometric data can also be received during the normal operation of another function of the device. For example, a fingerprint can be collected during the normal operation of a touch screen user input in a multimedia and/or communication device. A device 100 of some embodiments may be a crucifix and/or other religious symbol that a user touches. In some embodiments, an exemplary device can be a watch that performs a retinal scan when the user checks the time or causes another watch function to operate. In yet other embodiments, the device 100 can be a communication device that regularly stores and analyzes voice samples during normal communications. In some embodiments, the report can be generated external to the device 100 in a remote tracking system.

The device 100 is configured to transmit a report that can include the location data and/or the identity validation value to a recipient 106. The report can include data corresponding to a single point in time, a single location, and/or a log of entries corresponding to previously collected location and/or identification data. In addition to the location and identity data, the report can also include time and/or date data, and/or alert data that can communicate general information regarding the location and/or identity data. The recipient 106 can be a parent, guardian, or other caregiver for a child or other individual of limited capacity. In some embodiments, the recipient 106 can be a military or police officer or other personnel coordinator and/or monitor who can receive data regarding soldiers or police officers during patrol, combat, tactical, and/or other similar operations.

Figure 2:
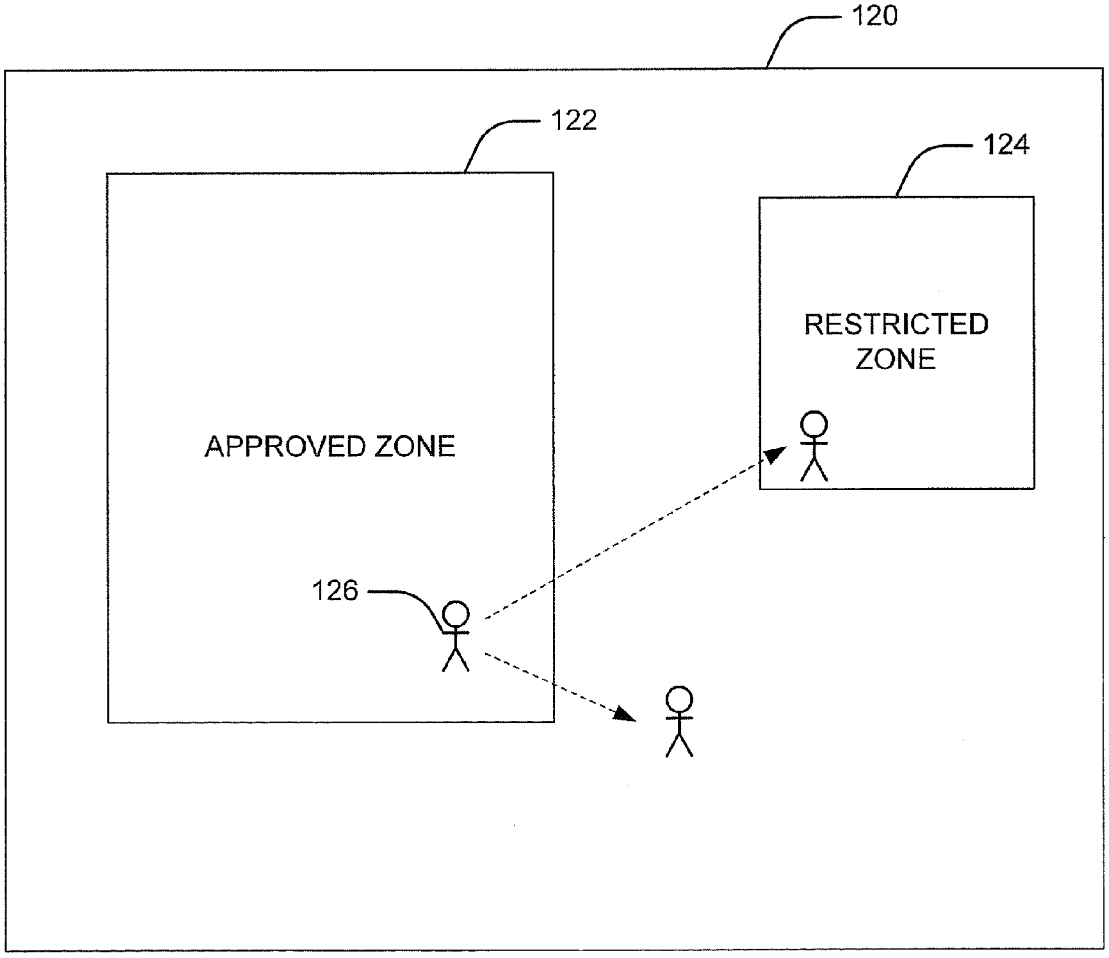
FIG. 2 is a block diagram illustrating an exemplary application for biometric confirmation in location-based tracking according to some embodiments of the present invention.

FIG. 2 is a block diagram illustrating an exemplary application for biometric confirmation in location-based tracking according to some embodiments of the present invention. In some embodiments, it may be beneficial to track the location of a user 126. The user 126 may be assigned or intended to be located within an approved zone 122 in a theatre of operations 120. The approved zone 122 may correspond to a predefined “safe zone” for soldiers, a patrol zone for soldiers and/or police officers, and/or a school and/or play zone for children. The recipient can receive reports under a variety of conditions. For example, a report can be generated and transmitted to a recipient when the user 126 exits the approved zone 122. In some embodiments, a report can be generated and transmitted when the user 126 enters a restricted zone 124. A restricted zone 124 may be defined by combat and/or other dangerous conditions, undesirable sections of a community, and/or specific locations designated as off limits. In some embodiments, a report regarding the crossing of an approved zone 122 boundary or a restricted zone 124 boundary can be generated as an alert report that can be in addition to regularly generated reports.

Figure 3:
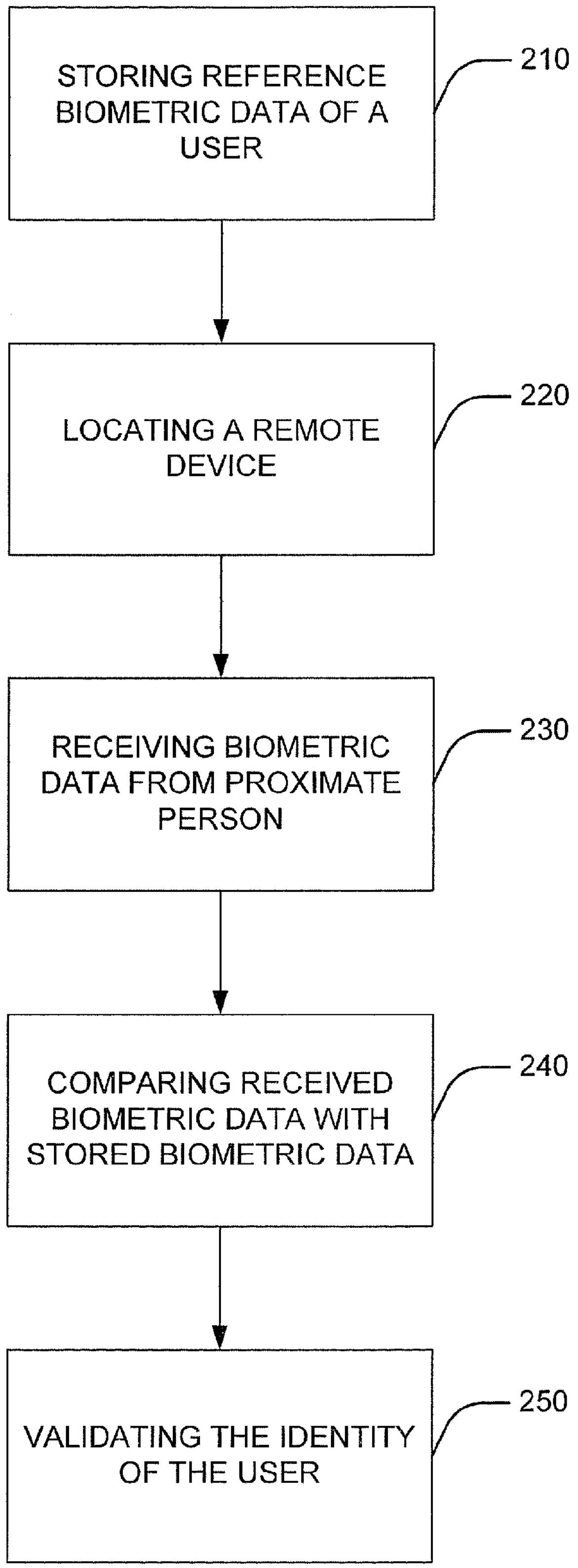
FIG. 3 is a flow diagram illustrating operations for biometric confirmation in location-based tracking according to some embodiments of the present invention.

Reference is now made to FIG. 3, which is a flow diagram illustrating operations for biometric confirmation in location-based tracking according to some embodiments of the present invention. The operations can begin with storing reference biometric data of a user in some embodiments (block 210). The reference biometric data can be a fingerprint, a retinal scan image, a voice print, and/or some other biological process related data that can be determined as unique or substantially unique to a user. The reference biometric data can be stored as part of a device setup function and, in some embodiments, can include requiring a key or other validating device and/or function to ensure that the stored data is that of the intended user. In some embodiments, the reference biometric data can be stored in a device that is external to a remote device.

Operations can also include locating a remote device (block 220). The locating can be performed using a variety of locating technologies including, for example, Global Positioning System (GPS) and/or radio frequency triangulation, among others. In some embodiments, the locating can be performed in response to a query from a recipient, in conjunction with the storing of received biometric data, and/or at predetermined intervals.

Biometric data can be received from a person proximate to the remote device (block 230). The biometric data type can correspond to one or more types of stored biometric data. The biometric data can be received by prompting the proximate person to provide the biometric input and/or through some self-identifying process whereby data is routinely collected during the use of one or more unrelated functions. In the case of a user prompt, the user can be prompted and a countdown timer can be used to provide a window of time in which the user can provide the biometric data. If the user fails to provide biometric data within the designated window of time, a confirmation report can be generated based on a previously logged validation. The confirmation report can also indicate collected location data that does not include corresponding identification data. In this manner, a recipient can track the device even in the absence of the identification information.

In some embodiments, biometric data of several types can be stored and the remote device can be configured to collect biometric data of multiple types based on which of the unrelated functions are being used. For example, voice data can be collected during the use of a communication device, fingerprint data can be collected while a user is manipulating an input device, and/or retinal scan data can be collected while a user is visually inspecting or accessing an unrelated function.

The received biometric data can be compared to the stored biometric data to determine the identity of the proximate person (block 240). The comparison can be performed in the remote device using reference biometric data stored within the remote device. In some embodiments, the comparison can be performed in an external device that can have reference biometric data stored and be configured to receive the biometric data from the remote device. Some embodiments can also include generating a confirmation report corresponding to the results of the comparison. The confirmation report can include a validation value that can be indicative of whether the proximate person is an authorized or expected user. The confirmation report can also include a location of the remote device and a time stamp that can be used to identify the time and date that the biometric data was received. In some embodiments, the confirmation report can be transmitted to a recipient. The transmission can be in response to a request by the recipient, in response to an event, such as exit of an approved zone or entry into an unapproved zone. The transmission can operate responsive to a defined schedule in other embodiments. In some embodiments, the remote device can receive a query from a recipient, verify the identity of the recipient, and generate and send a confirmation report. In some embodiments, the report can be generated in an external device that performs the comparison.

The comparison can be used to validate the identity of the user (block 250). By validating the identity of the user, a recipient can know where the user is located with a high degree of confidence. The validation can include generating an identity correlation value that can represent a correlation between the received biometric data and the stored biometric data. In some embodiments, the validation can include generating a flag, such as a bit having a first value that indicates that the proximate person is the user and second value that indicates that the proximate person is not the user. In some other embodiments, the validation can include generating a value indicating an identity of the proximate person among a group of users.

In some embodiments, the remote device can log, based on defined intervals or receipt of biometric data, a validation value, a validation location, and a validation time. In this manner, if subsequent biometric data is not provided or is invalid, the logged information can be used to determine the most recent time and location that the user was validly identified.

Figure 4:
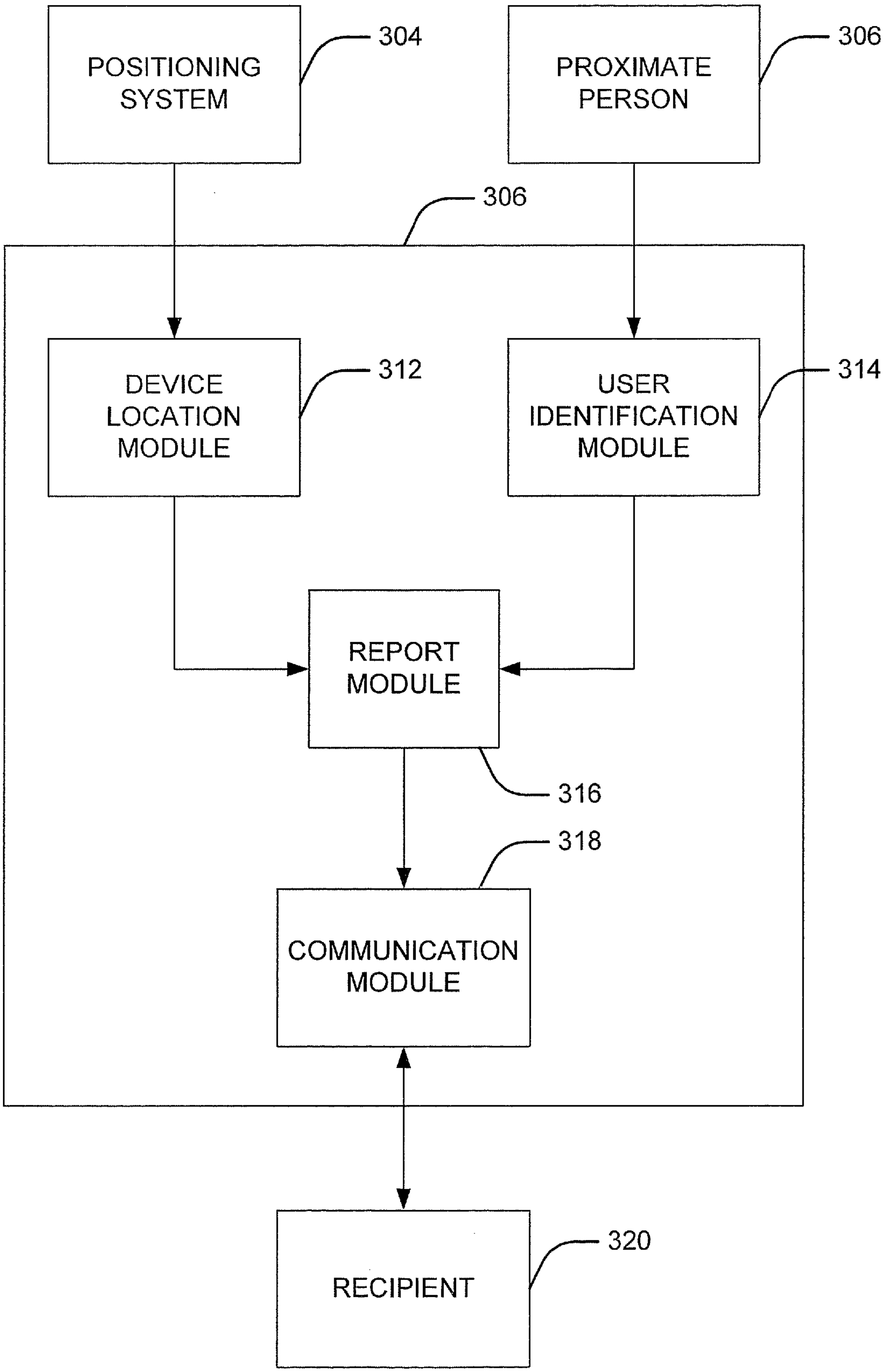
FIG. 4 is a block diagram illustrating operations for biometric confirmation in location-based tracking according to some embodiments of the present invention.

Reference is now made to FIG. 4, which is a block diagram illustrating operations for biometric confirmation in location-based tracking according to some embodiments of the present invention. A remote device 306 can be configured to include a device location module 312 that can receive data from a positioning system 304 and generate location data corresponding to the location of the remote device 306. The device location module 312 can be configured to determine the location responsive to an externally generated request, an event, and/or a predefined time interval. In addition to location data, some embodiments can provide speed and direction of movement of the remote device 306. The positioning system 304 can include satellite and/or terrestrial antennas and can be configured to support other primary functionality. For example, signals from existing radio transmission towers can be triangulated to determine the location.

The remote device 306 can also be configured to include a user identification module 314 that can be configured to receive biometric data from a proximate person 306 and validate a user identification and proximity to the remote device 306. In some embodiments, the proximate person 306 can be prompted to provide the biometric data. The biometric data can also be collected as the proximate person 306 uses other functional features of the remote device 306. In some embodiments, the biometric data can be fingerprint, voice print, retinal scan, and/or other biological processes and/or features through which a user identity can be validated and/or confirmed.

The location data and the user identification validation can be received by a report module 316 that can be configured to generate a report corresponding to the location of the remote device 306 and the identification of the user. The report module 316 can be configured to generate a report responsive to an external event, such as a request from a recipient 320. In some embodiments, the report module 316 can be configured to create a report that can include multiple location/identification entries corresponding to a logging function within the remote device 306.

The remote device 306 can also include a communication module 318 configured to provide communication between the remote device 306 and a recipient 320. In some embodiments, the recipient 320 can send a request for a confirmed location to the remote device 306. In some embodiments, the request can be in the form of a data request or, in the case of a telecommunication device, a telephone call. The request can include the address being queried and a validation code to verify that the requester is entitled to receive the information. After receiving a legitimate query, the communication module 318 can transmit the report to the recipient. In some embodiments, the communication module can transmit report data to a remote tracking system that can process the report data. In further embodiments, the processed report data can be accessed by the recipient via a communication network, such as, for example, the internet. The report can include the most recent confirmation of identity of the user and/or historical data regarding the users confirmed location.

Figure 5:
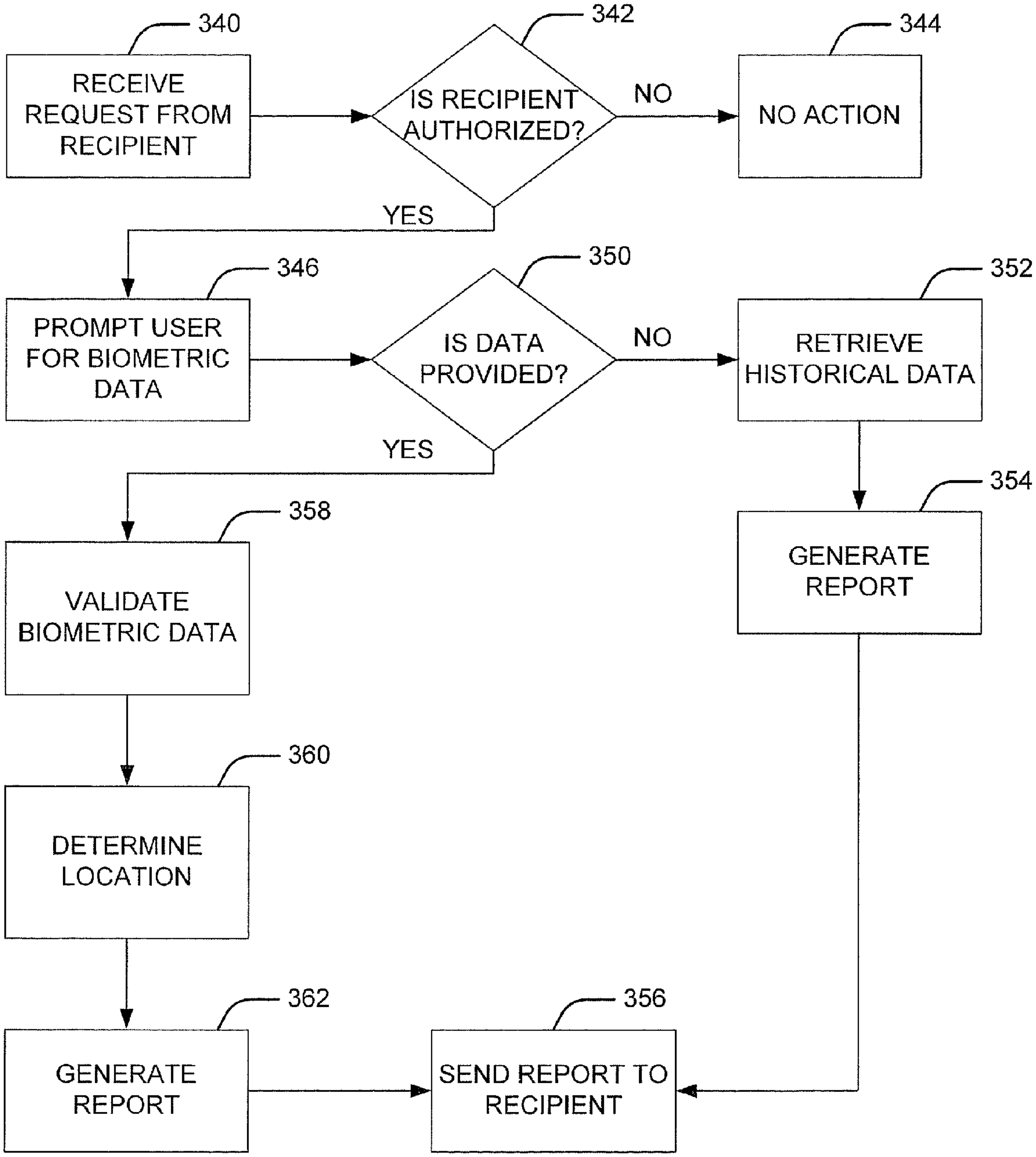
FIG. 5 is a flow diagram illustrating operations for biometric confirmation in location-based tracking according to some embodiments of the present invention.

Reference is now made to FIG. 5, which is a flow diagram illustrating operations for biometric confirmation in location-based tracking according to some embodiments of the present invention. A request for confirmed identity location data is received by a remote device from a recipient (block 340). In some embodiments, the request can include the unique address of the device being queried, recipient verification data, and/or a recipient address for receiving the confirmed location data. The request is evaluated to determine if the recipient is authorized to receive the data (block 342). If the recipient is not authorized to receive the data, the no action is taken (block 344). Alternatively, if the recipient is authorized to receive the data, a user is prompted to provide biometric data to the remote device (block 346). The remote device determines whether the biometric data is provided (block 350). If provided, the biometric data is validated (block 358). The validation can include comparing the received biometric data with previously stored user biometric data. The location of the remote device is determined (block 360) and a report is generated (block 362) that includes the remote device location and identity confirmation data. In some embodiments, the report can also include a timestamp, historical data, speed of the remote device, and/or direction of remote device. The report can then be sent to the recipient (block 356). If the biometric data is not provided when the user is prompted, historical data can be retrieved (block 352). A report of the historical data can be generated (block 354), which can be sent to the recipient (block 356).

Reference is now made to FIG. 6, which is a table 380 illustrating exemplary biometric input components for biometric confirmation in location-based tracking according to some embodiments of the present invention. The table 380 includes a device type column 382 that lists exemplary devices that can be used as a remote device in various embodiments. A biometric input column 384 lists examples of types of biometric input that can be used in the various device types. A primary function column 386 lists examples of primary functions that biometric interfaces can support in various embodiments. In some embodiments, a remote device may be a watch having a watch face that can also receive retinal scan information. A watch of some embodiments can include a watch crystal that can receive biometric data in the form of a fingerprint.

In some embodiments, a remote device can also be a portable telephone that can receive a voice print through the audio receiver during normal communication use. A remote device of some embodiments can be a personal digital assistant (PDA) that can receive fingerprint data through a touch sensitive display screen. The remote device can be a dog tag or other personnel identifier that can receive fingerprint data and/or data corresponding to a biological process and/or condition. In some embodiments, the remote device can be a music player that can receive fingerprint data during the normal use of an interface, such as a control pad. The remote device may also be configured as a religious symbol that can receive biometric data corresponding to a biological process and/or condition. In some embodiments, the remote device may be a camera or other optical device that can receive retinal scan data through the eyepiece. The features and combinations listed in this table 380 are presented as examples and are not intended to limit the scope or spirit of the invention. For example, these and other types of remote devices can use various types of biometric input that may be received through an interface that may or may not support another function.

Reference is now made to FIG. 7, which is a table 390 illustrating a report format for systems/methods/apparatus for biometric confirmation in location-based tracking according to some embodiments of the present invention. The report format of some embodiments can include location data 392 that can include a single entry and/or historical data that has been logged in the remote device. Each entry in the report can also include a timestamp 396. The timestamp 396 can include time, date, and/or the day of the week. The report can include a single entry corresponding to the most recent identity confirmed location and/or multiple entries of historical data.

Figure 8:
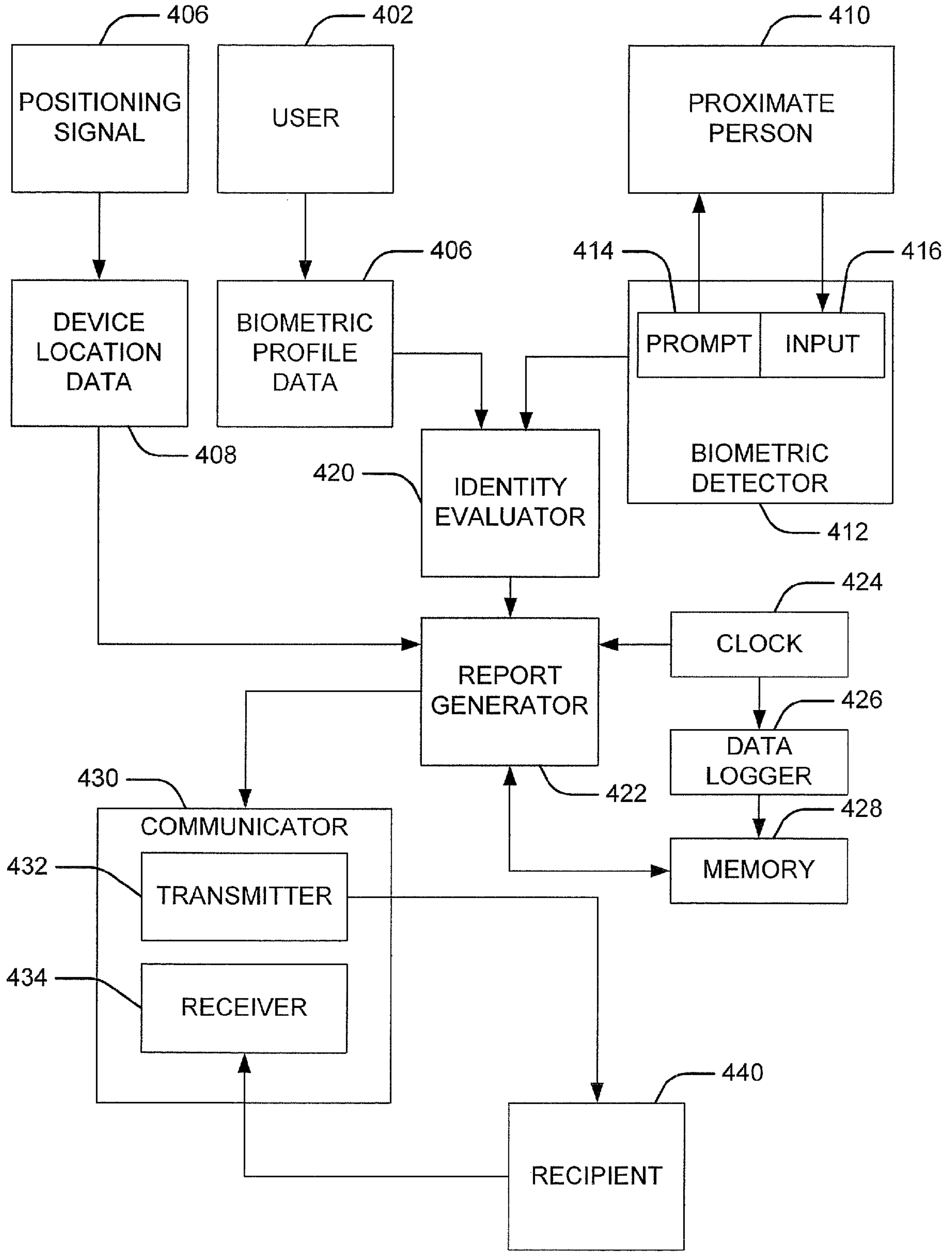
FIG. 8 is a block diagram illustrating systems for biometric confirmation in location-based tracking according to some embodiments of the present invention.

Reference is now made to FIG. 8, which is a block diagram illustrating a system for biometric confirmation in location-based tracking according to some embodiments of the present invention. A positioning signal 406 can be received to generate device location data 408. The device location data 408 can be communicated to a report generator 422 for inclusion in a report of location-based tracking. A user 402 can provide one or more biometric inputs to generate biometric profile data 406. A proximate person 410 can be sent a prompt 414 for a biometric input 416 by a biometric detector 412. A biometric input 416 received by the biometric detector 412 can be used in conjunction with the biometric profile data 406 by an identity evaluator 420. The identity evaluator 420 can compare the biometric input 416 with the biometric profile data 406 to generate an identity validation value, which can be received by the report generator 422. A clock 424 can provide the time and/or date to the report generator 422 so that the identity data and the location data can be timestamped. The clock 242 can also send time and/or date to a data logger 426 that can record the time of events such as location data 408 and/or biometric inputs 416 and store the events and timestamp in memory 428. A communicator 430 can include a receiver 434 that can receive requests for confirmed location data from a recipient 440. The communicator 430 includes a transmitter for sending location data to the recipient 440. The location data can be in the form of a report generated by the report generator 422 and can include the most recently confirmed location data and/or historical confirmed location and/or unconfirmed location data that is stored in the memory 428.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of biometric confirmation in location-based tracking, the method comprising:

storing, in a setup operation of a remote device, reference biometric data of a user;

locating the remote device using a wireless communication technique;

receiving, into the remote device, biometric data corresponding to a proximate person;

comparing the received biometric data with the stored biometric data to confirm an identity of the proximate person; and validating the identity of the user based on results of the comparing, wherein receiving biometric data includes initiating a countdown timer corresponding to a user response time to provide the biometric data and generating a confirmation report based on a previously logged validation responsive to the countdown timer.

2. The method of claim 1, further comprising:

generating a confirmation report corresponding to results of the comparing; and transmitting the confirmation report to a recipient;

wherein the confirmation report comprises:

a validation value that is correspondent to whether the proximate individual is the user;

a location of the remote device; and a time stamp, configured to identify the time and date that the biometric data is received.

3. The method of claim 2, further comprising transmitting the received biometric data from the remote device to an external device, wherein storing reference biometric data of a user comprises storing the reference biometric data in the external device, and wherein comparing the received biometric data with the stored biometric data to confirm the identity of the proximate person is performed in the external device.

4. The method of claim 1, further comprising logging, in the remote device, a validation value, a validation location, and a validation time.

5. The method of claim 1, wherein receiving biometric data comprises:

before initiating the countdown timer, prompting the user to provide the biometric data.

6. The method of claim 1, further comprising:

receiving a query from a recipient;

verifying the identity of the recipient; and generating a confirmation report corresponding to the validating; and transmitting the confirmation report to the recipient.

7. The method of claim 1, further comprising:

generating an alert report if the remote device traverses an approved geographical boundary, wherein the alert report comprises the location of the remote device; and transmitting the alert report to a recipient.

8. A system for providing location based tracking with biometric confirmation, comprising:

a location module in a remote device configured to determine a location of the remote device;

an identification module in the remote device configured to use biometric data to validate a user identification and proximity to the remote device at the location;

a report module configured to generate a report corresponding to the location and the user identification; and a communication module configured to receive query data from a recipient and to transmit the report to the recipient, wherein the report module is further configured to generate a confirmation report based on a previously logged validation responsive to a countdown timer.

9. The system of claim 8, wherein the identification module comprises:

a storage module configured to store biometric profile data of at least one user;

a detection module configured to receive biometric data from the at least one user; and an evaluation module configured to compare the received biometric data with the stored biometric profile data and generate a validation value that corresponds to a correlation between the received biometric data and the stored biometric data.

10. The system of claim 9, wherein the detection module comprises:

a prompt generator configured to provide the user with a prompt to provide biometric data; and a biometric input device configured to collect the biometric data.

11. The system of claim 10, wherein the biometric input device comprises a fingerprint scanner configured to receive image data corresponding to a fingerprint of the user.

12. The system of claim 8, wherein the communication module is further configured to transmit the report responsive to receipt of updated location and/or biometric data.

13. The system of claim 8, wherein the communication module is further configured to transmit an alert report if the location of the remote device is not in a first location zone and to transmit the alert report if the location of the remote device is in a second location zone, wherein the first location zone comprises an approved zone and the second location zone comprises a restricted zone.

14. The system of claim 8, further comprising a tracking module configured to store historical report data comprising location data, a validation value, and a timestamp.

15. An portable device for providing location based tracking with biometric confirmation, the portable device comprising:

a location identifier in the portable device configured to determine a geographical location of the portable device; and a biometric identifier in the portable device configured to determine an identity of a proximate person who is proximate to the portable device and to generate an identity validation value corresponding to the identity of the proximate person, wherein the biometric identifier is further configured:

to prompt the proximate person to provide biometric data, to initiate a countdown timer corresponding to a response time to provide the biometric data; and to generate a confirmation report based on a previously logged validation responsive to the countdown timer.

16. The portable device of claim 15, further comprising a location data transmitter configured to transmit the geographical location of the portable device and the identity validation value to a recipient.

17. The portable device of claim 16, further comprising a receiver configured to receive a query from the recipient, wherein the location data transmitter transmits responsive to the query.

18. The portable device of claim 15, wherein the biometric identifier further comprises:

a data storage device configured to store biometric profile data corresponding to the user;

a biometric data detector configured to collect proximate person biometric data; and an identity evaluator configured to compare the biometric profile data with the collected proximate person biometric data to determine if the proximate person is the user.

19. The portable device of claim 15, wherein the biometric identifier comprises a retinal scanner.

20. The portable device of claim 15, further comprising:

a first function module configured to provide a function that is different from the location identifier and the biometric identifier; and a non-identifier interface that is configured to receive input from the proximate person related to a first function, wherein a biometric detector is integrated into the non-identifier interface.

* * * * *